United States Patent
Akimov et al.

(10) Patent No.: US 7,272,504 B2
(45) Date of Patent: Sep. 18, 2007

(54) REAL-TIME IMAGING WHILE DRILLING

(75) Inventors: Oleg Akimov, Niedersachsen (DE);
Ansgar Baule, Lower Saxony (DE);
Christian Fulda, Lower Saxony (DE);
Sven Haberer, Niedersachsen (DE);
Thorsten Roessel, Niedersachsen (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/273,983

(22) Filed: Nov. 15, 2005

(65) Prior Publication Data
US 2007/0112521 A1 May 17, 2007

(51) Int. Cl.
*G01V 11/00* (2006.01)
(52) U.S. Cl. ............................................. 702/9; 702/6
(58) Field of Classification Search ............ 702/9, 702/6, 10, 7; 175/45, 50; 340/853.6, 853.9, 340/855.5
See application file for complete search history.

(56) References Cited

U.S. PATENT DOCUMENTS

| | | | |
|---|---|---|---|
| 4,628,202 A | 12/1986 | Minette | 250/269 |
| 5,191,548 A | 3/1993 | Balkanski et al. | 364/725 |
| 5,301,205 A | 4/1994 | Tsutsui et al. | 375/1 |
| 5,381,092 A * | 1/1995 | Freedman | 324/303 |
| 5,388,209 A | 2/1995 | Akagiri | 395/2.38 |
| 5,397,893 A | 3/1995 | Minette | 250/254 |
| 5,453,844 A | 9/1995 | George et al. | 358/426 |
| 5,519,668 A | 5/1996 | Montaron | 367/35 |
| 5,610,657 A | 3/1997 | Zhang | 348/415 |
| 5,684,693 A | 11/1997 | Li | 364/422 |
| 5,757,852 A | 5/1998 | Jericevic et al. | 375/240 |
| 5,812,068 A * | 9/1998 | Wisler et al. | 340/855.5 |
| 5,947,213 A | 9/1999 | Angle et al. | 175/24 |
| 6,021,377 A * | 2/2000 | Dubinsky et al. | 702/9 |
| 6,049,632 A | 4/2000 | Cockshott et al. | 382/239 |
| 6,088,294 A | 7/2000 | Leggett, III et al. | 367/25 |
| 6,112,809 A | 9/2000 | Angle | 166/66 |
| 6,229,453 B1 * | 5/2001 | Gardner et al. | 340/853.8 |
| 6,405,136 B1 | 6/2002 | Li et al. | 702/10 |
| 6,519,568 B1 * | 2/2003 | Harvey et al. | 705/1 |
| 6,584,837 B2 | 7/2003 | Kurkoski | 73/152.02 |
| 6,704,656 B1 * | 3/2004 | Abriol et al. | 702/6 |

FOREIGN PATENT DOCUMENTS

EP          0508728 A2     10/1992

* cited by examiner

*Primary Examiner*—Donald E McElheny, Jr.
(74) *Attorney, Agent, or Firm*—Madan, Mossman & Sriram, P.C.

(57) ABSTRACT

Measurements made by a formation evaluation sensor downhole are processed to produce an image and a bitstream characterizing the image is transmitted uphole. The parameters used in the downhole processing are dynamically alterable.

28 Claims, 3 Drawing Sheets

REAL-TIME IMAGING WHILE DRILLING

FIELD OF THE INVENTION

This invention relates generally to borehole logging apparatus for use during drilling operations and methods for acquiring subsurface measurements and communicating the data to the surface. More particularly, this invention relates to a method of transmitting high resolution formation evaluation imaging data in real time in a measurement-while-drilling (MWD) tool.

BACKGROUND OF THE ART

Oil well logging has been known for many years and provides an oil and gas well driller with information about the particular earth formation being drilled. In conventional oil well logging, after a well has been drilled, a probe known as a sonde is lowered into the borehole and used to determine some characteristic of the formations which the well has traversed. The probe is typically a hermetically sealed steel cylinder which hangs at the end of a long cable which gives mechanical support to the sonde and provides power to the instrumentation inside the sonde. The cable also provides communication channels for sending information up to the surface. It thus becomes possible to measure some parameter of the earth's formations as a function of depth, that is, while the sonde is being pulled uphole. Such "wireline" measurements are normally done in real time (however, these measurements are taken long after the actual drilling has taken place).

A wireline sonde usually transmits energy into the formation as well as a suitable receiver for detecting the same energy returning from the formation to provide acquisition of a parameter of interest. As is well known in this art, these parameters of interest include electrical resistivity, acoustic energy, or nuclear measurements which directly or indirectly give information on subsurface densities, reflectances, boundaries, fluids and lithologies among many others.

Examples of prior art wireline density devices are disclosed, for example, in U.S. Pat. No. 4,628,202 to Minette. Wireline formation evaluation tools (such as gamma ray density tools) have many drawbacks and disadvantages including loss of drilling time, the expense and delay involved in tripping the drillstring so as to enable the wireline to be lowered into the borehole and both the build up of a substantial mud cake and invasion of the formation by the drilling fluids during the time period between drilling and taking measurements. An improvement over these prior art techniques is the art of measurement-while-drilling (MWD) in which many of the characteristics of the formation are determined substantially contemporaneously with the drilling of the borehole.

Measurement-while-drilling (MWD) logging either partly or totally eliminates the necessity of interrupting the drilling operation to remove the drillstring from the hole in order to make the necessary measurements obtainable by wireline techniques. In addition to the ability to log the characteristics of the formation through which the drill bit is passing, this information on a real time basis provides substantial safety and logistical advantages for the drilling operation.

One potential problem with MWD logging tools is that the measurements are typically made while the tool is rotating. Since the measurements are made shortly after the drillbit has drilled the borehole, washouts are less of a problem than in wireline logging. Nevertheless, there can be some variations in the spacing between the logging tool and the borehole wall ("standoff") with azimuth. Nuclear measurements are particularly degraded by large standoffs due to the scattering produced by borehole fluids between the tool and the formation.

U.S. Pat. No. 5,397,893 to Minette, the contents of which are fully incorporated herein by reference, teaches a method for analyzing data from a MWD formation evaluation logging tool which compensates for rotation of the logging tool (along with the rest of the drillstring) during measurement periods. The density measurement is combined with the measurement from a borehole caliper, preferably an acoustic caliper. The acoustic caliper continuously measures the standoff as the tool is rotating around the borehole. If the caliper is aligned with the density source and detectors, this gives a determination of the standoff in front of the detectors at any given time. This information is used to separate the density data into a number of bins based on the amount of standoff. After a pre-set time interval, the density measurement can then be made. The first step in this process is for short space (SS) and long space (LS) densities to be calculated from the data in each bin. Then, these density measurements are combined in a manner that minimizes the total error in the density calculation. This correction is applied using the "spine and ribs" algorithm to give a corrected density.

U.S. Pat. No. 6,584,837 to Kurkoski, fully incorporated by reference herein, discloses a LWD density sensor that includes a gamma ray source and at least two NaI detectors spaced apart from the source for determining measurements indicative of the formation density. A magnetometer on the drill collar measures the relative azimuth of the NaI detectors. An acoustic caliper is used for making standoff measurements of the NaI detectors. Measurements made by the detectors are partitioned into spatial bins defined by standoff and azimuth. Within each azimuthal sector, the density measurements are compensated for standoff to provide a single density measurement for the sector. The azimuthal sectors are combined in such a way as to provide a compensated azimuthal geosteering density. The method of the invention may also be used with neutron porosity logging devices.

MWD instruments, in some cases, include a provision for sending at least some of the subsurface images and measurements acquired to recording equipment at the earth's surface at the time the measurements are made using a telemetry system (i.e. MWD telemetry). One such telemetry system modulates the pressure of a drilling fluid pumped through the drilling assembly to drill the wellbore. The fluid pressure modulation telemetry systems known in the art, however, are limited to transmitting data at a rate of at most only a few bits per second. Because the volume of data measured by the typical image-generating well logging instrument is relatively large, at present, borehole images are generally available only using electrical cable-conveyed instruments, or after an MWD instrument is removed from the wellbore and the contents of an internal storage device, or memory, are retrieved.

Many types of well logging instruments have been adapted to make measurements which can be converted into a visual representation or "image" of the wall of a wellbore drilled through earth formations. Typical instruments for developing images of parameters of interest measurements include density measuring devices, electrical resistivity measuring devices and acoustic reflectance/travel time measuring devices. These instruments measure a property of the earth formations proximate to the wall of the wellbore, or a related property, with respect to azimuthal direction, about a substantial portion of the circumference of the wellbore. The values of the property measured are correlated to both their depth position in the wellbore and to their azimuthal position with respect to some selected reference, such as geographic north or the gravitationally uppermost side of the wellbore. A visual representation is then developed by presenting the values, with respect to their depths and azimuthal orientations, for instance, using a color or gray tone which corresponds to the value of the measured property.

One method known in the art for transmitting image-generating measurements in pressure modulation telemetry is described, for example, in U.S. Pat. No. 5,519,668 to Montaron. This method includes making resistivity measurements at preselected azimuthal orientations, and transmitting the acquired resistivity values to the surface through the pressure modulation telemetry. The method described in the Montaron '668 patent requires synchronization of the resistivity measurements to known rotary orientations of the MWD instrument to be able to decode the image data at the surface without transmitting the corresponding rotary orientations at which the measurements were made.

U.S. Pat. No. 6,405,136 to Li, et al. discloses a method for compressing a frame of data representing parameter values, a time at which each parameter value was recorded, and an orientation of a sensor at the time each parameter value was recorded. Generally the method includes performing a two-dimensional transform on the data in the orientation domain and in a domain related to the recording time. In one embodiment, the method includes calculating a logarithm of each parameter value. In one embodiment, the 2-D transform includes generating a Fourier transform of the logarithm of the parameter values in the azimuthal domain, generating a discrete cosine transform of the transform coefficients in the time domain. This embodiment includes quantizing the coefficients of the Fourier transform and the discrete cosine transform. One embodiment of the method is adapted to transmit resistivity measurements made by an LWD instrument in pressure modulation telemetry so that while-drilling images of a wellbore can be generated. The one embodiment includes encoding the quantized coefficients, error encoding the encoded coefficients, and applying the error encoded coefficients to the pressure modulation telemetry.

Other data compression techniques, for various applications, are described in, for example, U.S. Pat. No. 5,757,852 to Jericevic et al, U.S. Pat. No. 5,684,693 to Li, U.S. Pat. No. 5,191,548 to Balkanski et al, U.S. Pat. No. 5,301,205 to Tsutsui et al, U.S. Pat. No. 5,388,209 to Akagiri, U.S. Pat. No. 5,453,844 to George et al, U.S. Pat. No. 5,610,657 to Zhang, and U.S. Pat. No. 6,049,632 to Cockshott et al. Many prior art data compression techniques are not easily or efficiently applicable to the extremely low bandwidth and very high noise level of the communication methods of the typical MWD pressure modulation telemetry system, and, have not been suitable for image transmission by such telemetry.

There is a need for a method of determining subsurface features in downhole logging data, for example with azimuthal density variations from measurements made by a MWD logging tool. Such a method preferably provides for real-time determination of down hole parameters for communication to the surface, or provides for real time imaging of the subsurface environment during drilling operations. The present invention satisfies this need.

SUMMARY OF THE INVENTION

One embodiment of the invention is a method of evaluating an earth formation. A formation evaluation (FE) sensor is conveyed on a bottomhole assembly (BHA) into a borehole in the earth formation. The FE sensor acquires data indicative of a property of the earth formation. A set of parameters characterizing an image of the data is defined, with at least a subset of the parameters being altered during the acquiring of the data. The data are processed to produce a bitstream representative of the image using the defined parameters and the bitstream is transmitted to a surface location. The data may be acquired during continued rotation of the BHA. The parameters characterizing the image may include the number of rows and columns of the image, the time resolution, the number of bits per pixel, the number of telemetry words per time frame for an image block, a scaling method and/or a method of data block creation. The alteration of the subset of parameters may be based on a time interval, specified depth intervals, at predefined depths, an output of the FE sensor and/or a predefined dip. The processing of the data may include interpolation and smoothing. The processing of the data may include creating an image block, and may further include applying a discrete cosine transform or a wavelet transform. The processing may also include encoding an image block using a Huffman encoder, a runlength encoder, an arithmetic encoder, a zero-tree encoder or a set partitioning of hierarchical trees. The transmitted bitstream may be decompressed at the surface location. The processing may further include a dip determination. Additionally, a direction of drilling of the BHA may be controlled based at least in part on the dip determination.

Another embodiment of the invention is a system for evaluating an earth formation. The system includes a FE sensor on a BHA conveyed into a borehole in the earth formation. The FE sensor acquires data indicative of a property of the earth formation. A processor defines a set of parameters characterizing an image of the data. A processor further alters at least a subset of the parameters during the acquisition of the data. A downhole data processes the data to produce a bitstream representative of the image using the defined parameters and transmits the bitstream to a surface location. The FE sensor may acquired the data during continued rotation of the BHA. The FE sensor may be a resistivity sensor, a density sensor, a porosity sensor, a micro-resistivity imaging sensor, a borehole televiewer, a gamma ray sensor and/or a caliper. The set of parameters may include the number of rows and columns of the image; a time resolution $T_r$, a number of bits per pixel, a number of telemetry words per time frame for one image block, a scaling method to be used, and a method of data block creation. The processor alters the subset of the parameters based on a time interval, at specified depth intervals, a predefined depth, an output of the FE sensor, and a determined dip. The downhole processor may process the data by including an interpolation and/or a smoothing operation. The downhole processor may process the data by using arithmetic averaging, harmonic averaging or geometric averaging. The processor may process the data by creating an image block. The processing may further include application of a discrete cosine transform and/or a wavelet transform to the image. The processor may process the data by encoding the image block using a Huffman encoder, an arithmetic encoder, a run-length encoder, a zero-tree encoder and/or set partitioning in hierarchical trees. The system may further include a surface processor which decompresses the transmitted bitstream, the decompressing including a decoding, an inverse transformation, a rescaling and/or storing into a database. A processor may further determine a dip angle. The downhole processor may further control a direction of drilling of the BHA based at least in part on the dip determination.

Another embodiment of the invention is a computer readable medium for use with an apparatus for evaluating an earth formation. The apparatus includes a FE sensor on a BHA conveyed into a borehole in the earth formation. The FE sensor acquires data indicative of a property of the earth formation. The medium includes instructions which enable a downhole processor to process the data to produce a bitstream representative of an image using defined parameters that are altered during the acquiring of the data. The medium further includes instructions which enable the processor to transmit the bitstream to a surface location. The computer readable medium may include a ROM, an EPROM, an EAROM, a flash memory and/or an optical disk.

BRIEF DESCRIPTION OF THE FIGURES

The present invention and its advantages will be better understood by referring to the following detailed description and the attached drawings in which.

DETAILED DESCRIPTION OF THE INVENTION

Figure 1:
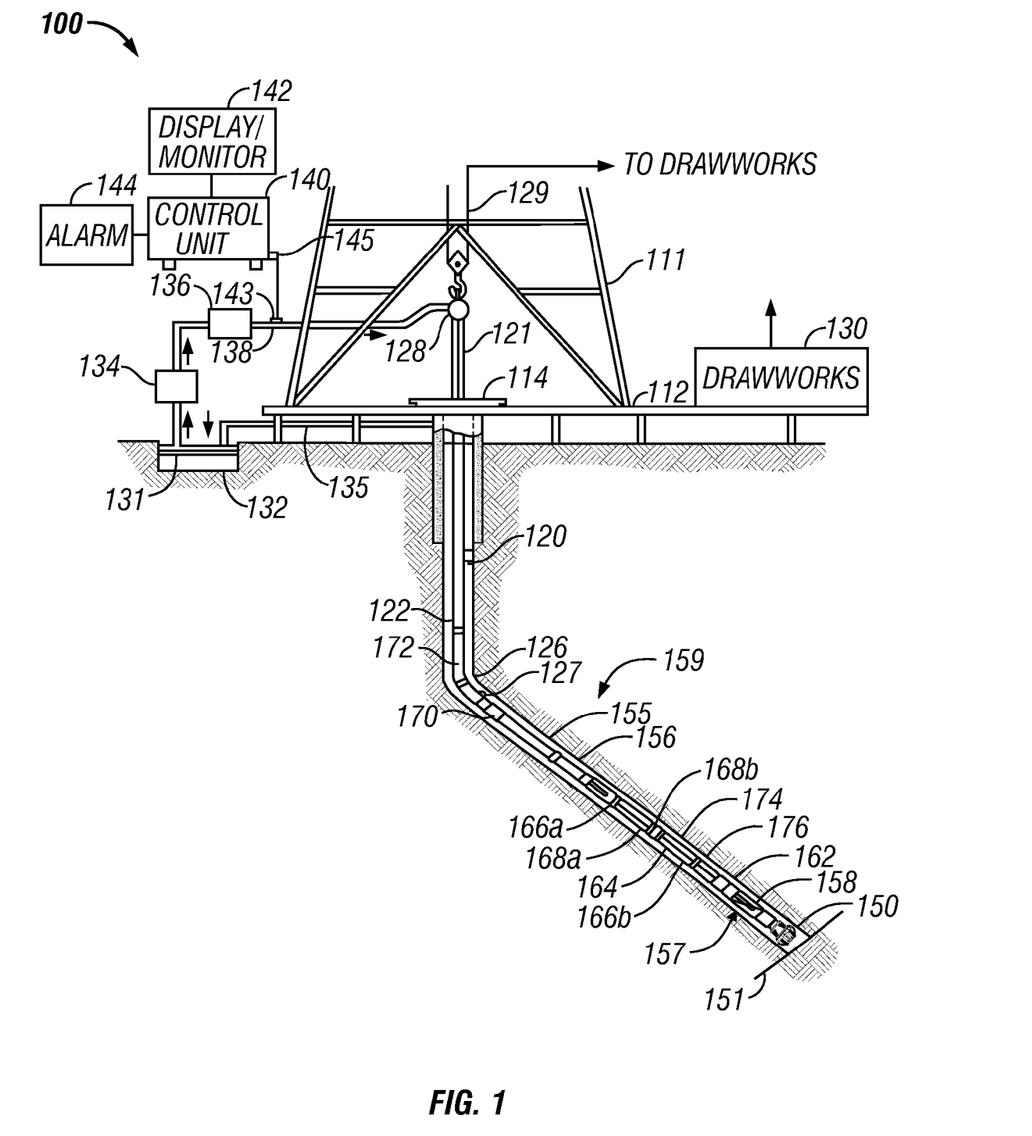
FIG. 1 shows a schematic diagram of a drilling system having a drill string that includes an apparatus according to the present invention.

FIG. 1 shows a schematic diagram of a drilling system 100 having a downhole assembly containing an acoustic sensor system and the surface devices according to one embodiment of present invention. As shown, the system 100 includes a conventional derrick 111 erected on a derrick floor 112 which supports a rotary table 114 that is rotated by a prime mover (not shown) at a desired rotational speed. A drill string 120 that includes a drill pipe section 122 extends downward from the rotary table 114 into a borehole 126. A drill bit 150 attached to the drill string downhole end disintegrates the geological formations when it is rotated. The drill string 120 is coupled to a drawworks 130 via a kelly joint 121, swivel 128 and line 129 through a system of pulleys 127. During the drilling operations, the drawworks 130 is operated to control the weight on bit and the rate of penetration of the drill string 120 into the borehole 126. The operation of the drawworks is well known in the art and is thus not described in detail herein.

During drilling operations a suitable drilling fluid (commonly referred to in the art as "mud") 131 from a mud pit 132 is circulated under pressure through the drill string 120 by a mud pump 134. The drilling fluid 131 passes from the mud pump 134 into the drill string 120 via a desurger 136, fluid line 138 and the kelly joint 121. The drilling fluid is discharged at the borehole bottom 151 through an opening in the drill bit 150. The drilling fluid circulates uphole through the annular space 127 between the drill string 120 and the borehole 126 and is discharged into the mud pit 132 via a return line 135. Preferably, a variety of sensors (not shown) are appropriately deployed on the surface according to known methods in the art to provide information about various drilling-related parameters, such as fluid flow rate, weight on bit, hook load, etc.

A surface control unit 140 receives signals from the downhole sensors and devices via a sensor 143 placed in the fluid line 138 and processes such signals according to programmed instructions provided to the surface control unit. The surface control unit displays desired drilling parameters and other information on a display/monitor 142 which information is utilized by an operator to control the drilling operations. The surface control unit 140 contains a computer, memory for storing data, data recorder and other peripherals. The surface control unit 140 also includes models and processes data according to programmed instructions and responds to user commands entered through a suitable means, such as a keyboard. The control unit 140 is preferably adapted to activate alarms 144 when certain unsafe or undesirable operating conditions occur.

A drill motor or mud motor 155 coupled to the drill bit 150 via a drive shaft (not shown) disposed in a bearing assembly 157 rotates the drill bit 150 when the drilling fluid 131 is passed through the mud motor 155 under pressure. The bearing assembly 157 supports the radial and axial forces of the drill bit, the downthrust of the drill motor and the reactive upward loading from the applied weight on bit. A stabilizer 158 coupled to the bearing assembly 157 acts as a centralizer for the lowermost portion of the mud motor assembly.

In one embodiment of the system of present invention, the downhole subassembly 159 (also referred to as the bottomhole assembly or "BHA") which contains the various sensors and MWD devices to provide information about the formation and downhole drilling parameters and the mud motor, is coupled between the drill bit 150 and the drill pipe 122. The downhole assembly 159 preferably is modular in construction, in that the various devices are interconnected sections so that the individual sections may be replaced when desired.

Figure 3:
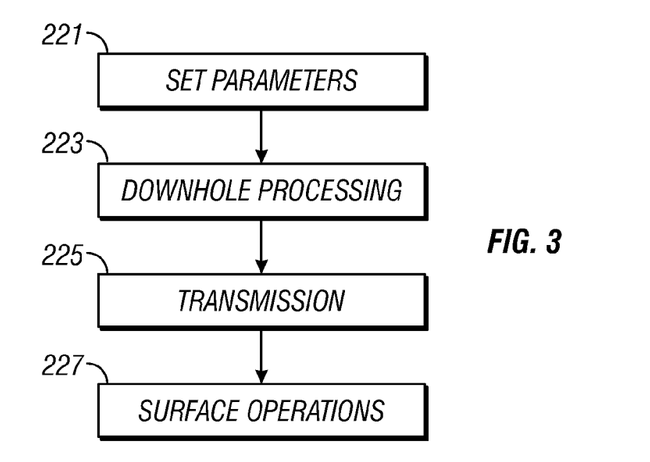
FIG. 3 is a flow chart illustrating the overall organization of the present invention.

Still referring to FIG. 3, the BHA also preferably contains sensors and devices in addition to the above-described sensors. Such devices may include a device for measuring the formation resistivity near and/or in front of the drill bit, a gamma ray device for measuring the formation gamma ray intensity and devices for determining the inclination and azimuth of the drill string. The formation resistivity measuring device 164 may be coupled above the lower kick-off subassembly 162 that provides signals, from which resistivity of the formation near or in front of the drill bit 150 is determined. A multiple propagation resistivity device ("MPR") having one or more pairs of transmitting antennae 166a and 166b spaced from one or more pairs of receiving antennae 168a and 168b is used. Magnetic dipoles are employed which operate in the medium frequency and lower high frequency spectrum. In operation, the transmitted electromagnetic waves are perturbed as they propagate through the formation surrounding the resistivity device 164. The receiving antennae 168a and 168b detect the perturbed waves. Formation resistivity is derived from the phase and amplitude of the detected signals. The detected signals are processed by a downhole circuit that is preferably placed in a housing 170 above the mud motor 155 and transmitted to the surface control unit 140 using a suitable telemetry system 172. In addition to or instead of the propagation resistivity device, a suitable induction logging device may be used to measure formation resistivity.

The inclinometer 174 and gamma ray device 176 may be placed along the resistivity measuring device 164 for respectively determining the inclination of the portion of the drill string near the drill bit 150 and the formation gamma ray intensity. Any suitable inclinometer and gamma ray device, however, may be utilized for the purposes of this invention. In addition, an azimuth device (not shown), such as a magnetometer or a gyroscopic device, may be utilized to determine the drill string azimuth. Such devices are known in the art and are, thus, not described in detail herein. In the above-described configuration, the mud motor 155 transfers power to the drill bit 150 via one or more hollow shafts that run through the resistivity measuring device 164. The hollow shaft enables the drilling fluid to pass from the mud motor 155 to the drill bit 150. In an alternate embodiment of the drill string 120, the mud motor 155 may be coupled below resistivity measuring device 164 or at any other suitable place.

The drill string contains a modular sensor assembly, a motor assembly and kick-off subs. In one embodiment, the sensor assembly may include a resistivity device, gamma ray device and inclinometer, all of which are in a common housing between the drill bit and the mud motor. The downhole assembly of the present invention may include a MWD section which contains a nuclear formation porosity measuring device, a nuclear density device, an acoustic sensor system placed, and a formation testing system above the mud motor 164 in the housing for providing information useful for evaluating and testing subsurface formations along borehole 126. A downhole processor may be used for processing the data.

Wireline logging tools have been used successfully to produce subsurface images. For MWD applications, measurements made by the downhole sensors have usually been stored in the MWD tool's memory. Therefore subsurface images and parameter determinations have not been generally available for real time applications such as geosteering.

Figure 2:
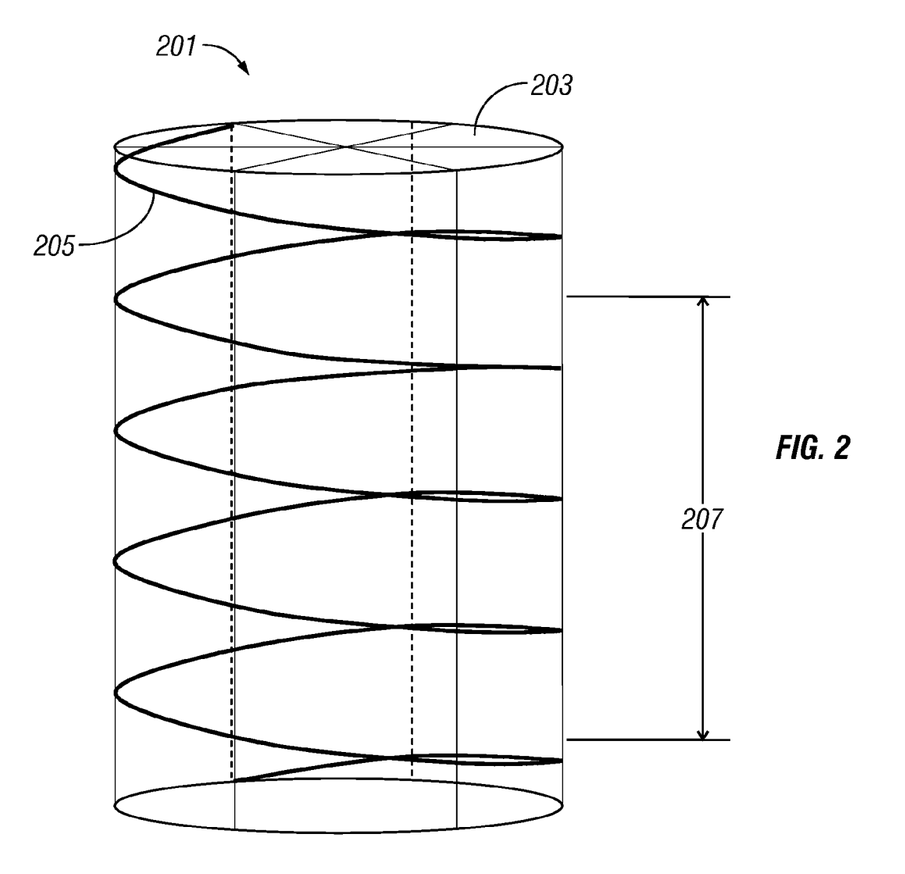
FIG. 2 illustrates the sensor path for data acquisition by an imaging tool while drilling.

The present invention which provides for acquiring parameters of interest is discussed without reference to the output of any specific sensor, i.e., from any one of a variety of formation evaluation sensors, including a resistivity sensor, a density sensor, a porosity sensor, a micro-resistivity imaging sensor, a borehole televiewer, a gamma ray sensor and/or a caliper (acoustic or mechanical). Turning now to FIG. 2, a borehole 201 is shown with six azimuthal sectors. One of them is labeled as 203. The use of six sectors is not to be construed as a limitation of the invention and commonly, more sectors may be used. As drilling progresses, a sensor on the BHA that makes a measurement of a property of the borehole wall (or the adjacent formation) traces out a spiral path depicted by 205. The spiral path will have a uniform pitch if the rate of penetration (ROP) of the BHA into the formation is uniform. In practice, the ROP may not be uniform.

The image comprises three measured quantities. The first is time measured by an internal clock on the BHA. The second is a toolface angle measured by a suitable orientation device such as a magnetometer or a gyroscope. The toolface angle can be referenced to magnetic north or to the highside of the tool. The difference of these toolface angles depends on tool azimuth and inclination and can be measured separately or calculated from tool azimuth and inclination measurements. Borehole azimuth and inclination can be measured separately. In one embodiment of the invention, they are measured by the directional sonde of OnTrak™, a trademark of Baker Hughes Incorporated. Magnetic dip can be measured at the surface or can be determined for instance by British Geological Survey Global Geomagnetic Model (BGGM). A third quantity defining the image is a formation property such as electrical resistivity, density, or porosity. The image itself consists of a matrix of formation evaluation measurements where row and column number of each matrix cell is characterized by time and toolface angle, respectively. The penetration $\Delta L$ during one increment of the memory stamp $T_M$ is indicated in FIG. 2 by 207. The objective of the invention is to transmit data from the downhole location to the surface and then reconstruct the image. The transmission of the data is done using a suitable telemetry channel. It should be noted that the FE sensor does not have to make measurements during continued rotation of the BHA.

Turning now to FIG. 3, a flow chart illustrates the overall sequence of operations for the present invention. At 221, the real-time imaging parameters are set. 223 refers to the downhole operations. 225 broadly refers to operations relating to the transmission of the data from the downhole location to the surface location, and 227 refers to operations at the surface. These broad categories are discussed next.

The set of parameters 221 determine the quality of the image received in real-time. Programming the tool can be done while the tool is on surface or via downlink while the tool is downhole. The realtime imaging parameters which are provided to the tool include:

(i) the number of rows (row) and columns (col) of the image;
(ii) the time resolution $T_r$: this is the time covered by one single data row;
(iii) the number of bits per pixel BpP which is the number of bits with which the measured formation evaluation values will be discretized
(iv) the number of telemetry words per time frame for one image block NoMPTW
(v) the scaling method to be used; and
(vi) the method of data block creation.

The parameters listed above are not meant to be inclusive, and in principle, there are other parameter sets possible which are related to the parameters in the list above.

The present invention also includes conditional telemetry which alters at least a subset of the preset parameters. With this technique, it is possible to change the options for real-time imaging such as resolutions in time, toolface angle and resistivity. These options are defined by the set of parameters. The parameters can be changed while the drilling process is ongoing. This can be very helpful for geosteering applications. Resetting of parameters can be done manually via downlinks or automatically when the measured data fulfill specific conditions. For example, this may be done at regular time intervals, at regular depth intervals, when specific predefined depth is attained, when measured formation evaluation values shows significant variation and/or when dips are found by automatic dip detection algorithms as known in the art. The options for real-time transmission can also be controlled by other formation evaluation measurement tools, e.g. bulk measurement tools.

Figure 4:
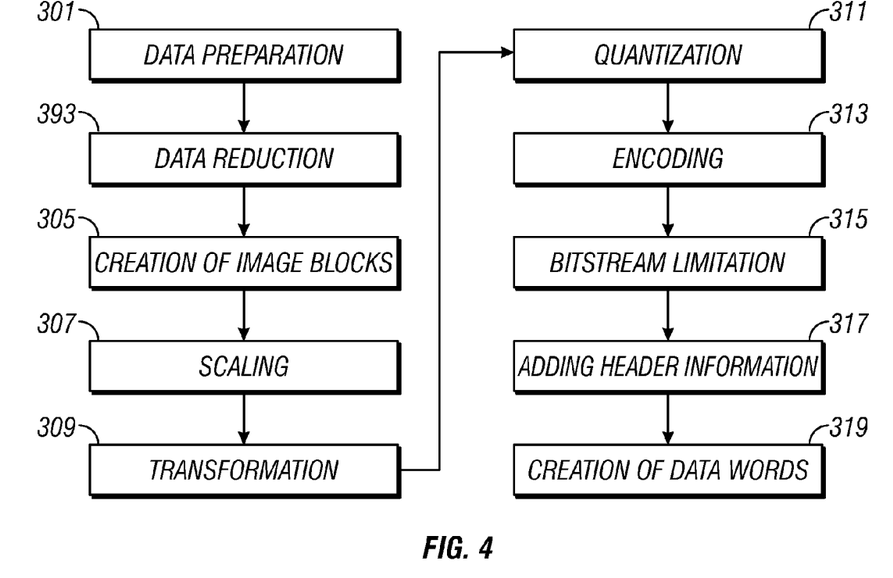
FIG. 4 is a flow chart illustrating the downhole operations of the present invention.

The downhole processing 223 of FIG. 3 is discussed further with reference to FIG. 4. An optional step of data preparation 301 may be done. If used, this involves interpolation and/or smoothing. Any prior art method may be used for data preparation. Data reduction 393 is used when the amount of acquired data is too large so that even with an effective compression technique it is not possible to send the data in real-time. In this case, the image data must be reduced e.g. by averaging to reduce the data to an amount which can be sent with the actual telemetry rate. The amount of data to which the original data set must be reduced is defined by row, col and $T_r$. Different averaging techniques such as arithmetic averaging, harmonic averaging, or geometric averaging may be used. In addition, if col (the number of columns) differs from the number of sectors in the original data (see FIG. 2), gridding techniques are applied.

In the next step of creating image blocks 305, the measured and possibly averaged and gridded image data is divided into parts, so called image blocks. The definition of the image blocks is related to the compression and transformation (discussed below). In many instances, the most effective compression is achieved when the image has equal numbers of rows and columns which are power of two (4, 8, 16, 32, 64, . . . ). Block creation can be done by the block-dynamic method, or by a consecutive dynamic method. In the block dynamic method, the image is divided into blocks according to the preferred vertical and horizontal image size. For each block maximum and minimum of the measured formation evaluation values will be calculated. Scaling of the image (discussed below) is based on these maximum and minimum values. Maximum and minimum values for each block are transmitted together with the image.

In the consecutive dynamic method, the original data set is dynamically scaled according to a predefined scaling window. The dynamically scaled image is then divided into blocks according to the preferred vertical and horizontal image size. For each block maximum and minimum value will be calculated. Scaling of the image is based on these maximum and minimum values. It is not needed to transmit maximum and minimum values for the consecutively dynamic method.

Scaling 307 of the data is based on the number of bits BpP, By scaling, the maximum and minimum values in each block will be assigned to 0 and BpP −1. Between these extremal values different scaling schemes can be used. Linear scaling or logarithmic scaling are used in different embodiments of the invention, but any other scaling function would be also possible.

In one embodiment of the invention, transformation 309 of the data is done using a Discrete Cosine Transform. In an alternate embodiment of the invention, a discrete wavelet transform is applied. These transforms are well known in the art and are not discussed further here. The term "wavelet transform" refers to the representation of a signal in terms of a finite length or fast decaying oscillating waveform (known as the mother wavelet). This waveform is scaled and translated to match the input signal. The transformation applied at 309 also compresses the data. Following the transformation/compression, the image block is quantized 311.

The next step of the downhole processing is encoding of the data 313. In one embodiment of the invention, the Set-Partioning In Hierarchical Trees (SPIHT) encoder is used. This type of encoding is discussed in Said et al. The SPIHT algorithm uses the principle of partial ordering by magnitude, set partitioning by significance of magnitudes with respect to a sequence of octavely decreasing thresholds, ordered bit plane transmission, and self-similarity across scale in an image wavelet transform. Other encoding, such as Huffman coding, run-length coding, arithmetic coding and zero-tree coding (as the terms are understood in the art of communications) may be used. Huffman coding is an entropy encoding algorithm used for lossless data compression. The term refers to the use of a variable-length code table for encoding a source symbol (such as a character in a file) where the variable-length code table has been derived in a particular way based on the estimated probability of occurrence for each possible value of the source symbol. Arithmetic coding is a method for lossless data compression. It is a form of entropy encoding, but where other entropy encoding techniques separate the input message into its component symbols and replace each symbol with a code word, arithmetic coding encodes the entire message into a single number, a fraction n where $(0.0 \leq n < 1.0)$. The length of the bitstream after the coding is variable and depends on the image itself. The term bitstream is used in its ordinary meaning of a time series of bits.

The length of the bitstream is reduced 315 by removing the rear of it to an amount of bits according to the compressed image size. The compressed image size CIS is calculated by $$CIS = RBPTFTMPT - HSiBiSA - (NoMPTW \cdot NoOfSB) \quad (1),$$

where RBPTFTMPT=Real bits per time frame for one image block is given by $$RBPTFTMPT = FLOOR\left(\frac{BTFMPT}{NoBPDW}\right) \cdot NoBPDW \quad (2)$$

with BTFMPT=Bits per time frame for one image block $$BTFMPT = V_v \cdot T_{ofi} \quad (3),$$

$V_v$=virtual channel speed $$V_v = \frac{M}{N} \cdot MPTS, \quad (4)$$

M=telemetry words dedicated to the formation evaluation imaging tool

N=all telemetry words

MPTS=telemetry rate $T_{ofi}$=Time frame for image $$T_{ofi} = \text{row} \cdot T_r \quad (5),$$

row=number of rows in the block $T_r$=time resolution of the block

NoBDPDW=number of bits per data word

HSiBiSA=Header size in bits in static approach, HSiBiSA is estimated to be 28 for block dynamic method and 12 for consecutively dynamic method.

NoMPTW=Number of telemetry words per time frame for one image block $$NoMPTW = FLOOR\left(\frac{BTFMPT}{NoBDPDW}\right), \quad (6)$$

NoOfSB=Number of status bits in each telemetry word, NoOfSB=1

The compression ratio can then be calculated to be $$CR = \frac{CIS}{row \cdot col \cdot BpP}, \quad (7)$$

Header information is added 317. Each block represented by the limited bitstream according gets a header depending on method of creating image blocks 305. When the block dynamic method is use, the header includes time information of the block, maximum value of measured formation evaluation value inside block and minimum value of measured formation evaluation value inside block. For consecutively dynamic method the header includes time information of the block. Other information can be added as well, e.g. time resolution of image, number of rows and columns, etc.

The next step of downhole processing is the creation of the data words 319. The bitstream consisting of the image block together with the header information is divided into single datawords which are transmitted. To each data word an information flag may be added which indicates whether the data word represents header information or image block information Returning to FIG. 3, the data are transmitted 225. Transmission of the data in one embodiment of the invention using existing software like HST-Decode and MessageServer, although any suitable technique could be used.

Figure 5:
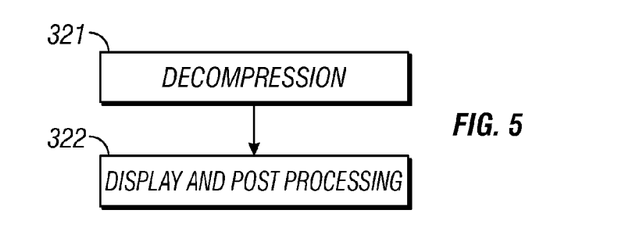
FIG. 5 is a flow chart illustrating the surface operations carried out on telemetered data from downhole.

Still referring to FIG. 3, the data at the surface are processed further 227. The main processing in one embodiment of the invention is illustrated in FIG. 5. Decompression of the data 321 includes decoding, an inverse transformation, rescaling and storing to the database without the header information. The decoding is the inverse of the encoding discussed above with reference to 313. The inverse transformation is the inverse of the transformation discussed above with reference to 309. The rescaling undoes the effect of scaling 307.

Display and postprocessing 322 of the images can be performed by standard methods already implemented in imaging software. In one embodiment of the invention, the RECALL™ system of Petris Technology Inc. is used. This is not to be construed as a limitation and any suitable software package may be used. One or more of following capabilities should be included in the processing package. To make the software real-time applicable for geosteering, it should include the features:

time-depth correlation which can be measured by methods well known in the art. In the preferred embodiment of the invention the time-depth correlation will be read from the Advantage™ data base picking and calculation of dips:

for picking dips according standard techniques may include:

manually fitting of sinusoids into the image defining points on a visible sinusoid in the image by mouse-click and fit a sinusoid through these points automatic or semi-automatic dip picking methods as known in the art From the sinusoids apparent dips can be calculated by $$D = \arctan\left(\frac{\Delta L}{d + 2DOI}\right) \quad (8)$$

with: D=apparent dip, ΔL=2×amplitude of sinusoid in the image, d=borehole diameter and DOI=depth of investigation;

$$A_{zT} = T(\text{sinusoid minimum}) \quad (9)$$

where: T=toolface angle.

The technique should include the ability to calculate true dip and true dip azimuth from apparent dip and dip azimuth. The relationship of these two is described by $D_{true} = \pi - \arccos(\cos I \cos D + \sin I \sin D \cos(A_{zT}))$,
$\arccos(\cos I \cos D + \sin I \sin D \cos(A_{zT})) \geq \pi/2 = \arccos(\cos I \cos D + \sin I \sin D \cos(A_{zT}))$, else where: I=inclination, D=apparent dip of a formation (=0° if the borehole will cross perpendicular), $A_{zT}$=apparent azimuth of the formation dip referenced to tool high- $$A_{z,true} = A - \arccos\left(\frac{\cos D - \cos I \cdot \left(\begin{array}{c}\cos I \cos D + \\ \sin I \sin D \cos(A_{zT})\end{array}\right)}{\sin I \sin D_{true}}\right), \quad (11)$$

$\sin(A_{zT}) \geq 0$ and $\arccos(\cos I \cos D + \sin I \sin D \cos(A_{zT})) \geq \frac{\pi}{2}$ $$= \pi + A - \arccos\left(\frac{\cos D - \cos I \cdot \left(\begin{array}{c}\cos I \cos D + \\ \sin I \sin D \cos(A_{zT})\end{array}\right)}{\sin I \sin D_{true}}\right),$$

$\sin(A_{zT}) \geq 0$ and $\arccos(\cos I \cos D + \sin I \sin D \cos(A_{zT})) < \frac{\pi}{2}$ $$= A + \arccos\left(\frac{\cos D - \cos I \cdot \left(\begin{array}{c}\cos I \cos D + \\ \sin I \sin D \cos(A_{zT})\end{array}\right)}{\sin I \sin D_{true}}\right),$$

$\sin(A_{zT}) < 0$ and $\arccos(\cos I \cos D + \sin I \sin D \cos(A_{zT})) \geq \frac{\pi}{2}$ $$= -\pi + A + \arccos\left(\frac{\cos D - \cos I \cdot \left(\begin{array}{c}\cos I \cos D + \\ \sin I \sin D \cos(A_{zT})\end{array}\right)}{\sin I \sin D_{true}}\right),$$

$\sin(A_{zT}) < 0$ and $\arccos(\cos I \cos D + \sin I \sin D \cos(A_{zT})) < \frac{\pi}{2}$ where I=borehole inclination, D=apparent dip of a formation (=0° if the borehole will cross perpendicular), A=borehole azimuth referenced to magnetic north, $A_{zT}$=apparent azimuth of the formation dip referenced to tool high-side. Borehole azimuth and inclination can be taken from the Common Data Area (CDA) or from the data base which covers all measurements from the drilling job.

In addition, the postprocessing and display software may include the following features:

the image can be displayed vs. time or depth static and dynamic scaling of the displayed image (not to confuse with the scaling for compression).

different types of scaling (e.g. linear/logarithmic) can be applied to the image (not to be confused with the scaling for compression).

interpolation/smoothing of the image a zoom function to browse/display image data stored in history For later post processing the data stream—computed and stored in data base—will be exported to standard log formats, e.g. xtf-format or las-format.

Figure 6:
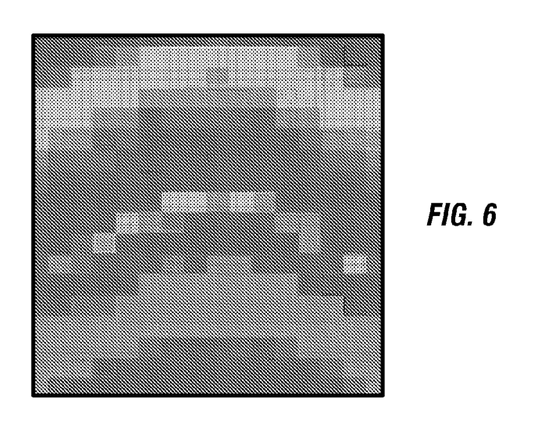
FIG. 6 is an example of an image that could be produced using the method of the present invention.

Turning now to FIG. 6, an example of an image of a borehole wall is shown. This is the type of image that would be transmitted substantially in real-time using the method of the present invention. The abscissa is the toolface angle while the ordinate is depth or time. The sinusoidal shapes in the image correspond to planar bed boundaries intersecting the cylindrical borehole at an angle. Part of the image processing described above with reference to eqns. (8)-(11) relate to determining the dip angle and azimuth from such an image.

The processing of the data may be accomplished by a combination of a downhole processor and a surface processor. As noted above, the setting of the parameters 221 may be done on the surface or via a downlink while the tool is downhole. In the latter case, both surface and downhole processors are necessary. The conditional telemetry discussed above may be done manually or automatically. In the latter case, a downhole processor may do the necessary parameter setting All of the downhole processing 223 and transmission 225 would be done by a downhole processor. All of the surface operations would be done by a surface processor. For the purposes of the present invention, a field programmable gate array is considered to be a processor. Implicit in the control and processing of the data is the use of a computer program implemented on a suitable machine readable medium that enables the processor to perform the control and processing. The machine readable medium may include ROMs, EPROMs, EAROMs, Flash Memories and Optical disks.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of evaluating an earth formation, the method comprising:
   (a) conveying a formation evaluation (FE) sensor on a bottom-hole assembly (BHA) into a borehole in the formation;
   (b) acquiring data indicative of a property of the earth formation using the FE sensor;
   (c) defining a set of parameters characterizing an image of the data, at least a subset of the parameters being altered during the acquiring of the data;
   (d) processing the data to produce a bitstream representative of the image using the defined parameters; and
   (e) transmitting the bitstream to a surface location.

2. The method of claim 1 wherein the FE sensor acquires the data during continued rotation of the BHA.

3. The method of claim 1 wherein the FE sensor is selected from the group consisting of (i) a resistivity sensor, (ii) a density sensor, (iii) a porosity sensor, (iv) a micro-resistivity imaging sensor, (v) a borehole televiewer, (vi) a gamma ray sensor, and (vii) a caliper.

4. The method of claim 1 wherein the set of parameters comprises at least one of (i) the number of rows and columns of the image; (ii) a time resolution $T_r$, (iii) a number of bits per pixel, (iv) a number of telemetry words per time frame for one image block, (v) a scaling method to be used; and (vi) a method of data block creation.

5. The method of claim 1 wherein alteration of a subset of the parameters is based on at least one of: (i) a time interval, (ii) at specified depth intervals, (iii) a predefined depth, (iv) an output of the FE sensor, and (v) a determined dip.

6. The method of claim 1 wherein the processing of the data further comprises at least one of (i) interpolation, and (ii) smoothing.

7. The method of claim 1 wherein the processing of the data further comprises a data reduction using one of (i) an arithmetic averaging, (ii) a harmonic averaging, and (iii) a geometric averaging.

8. The method of claim 1 wherein the processing further comprises creating an image block.

9. The method of claim 8 wherein the processing further comprises applying a transformation to an image block, the transformation selected from (i) a discrete cosine transform, and (ii) a wavelet transform.

10. The method of claim 8 wherein the processing further comprises encoding an image block using an encoder selected from (i) a Huffman encoder, (ii) a runlength encoder, (iii) an arithmetic encoder, (iv) a zero tree encoder, and (v) a set partitioning in hierarchical trees.

11. The method of claim 1 further comprising decompressing the transmitted bitstream at the surface location, the decompressing including at least one of (i) decoding, (ii) an inverse transform, (iii) a rescaling, and (iv) storing into a database.

12. The method of claim 11 wherein the processing further comprises a dip determination.

13. The method of claim 11 further comprising controlling a direction of drilling of the BHA based at least in part on the dip determination.

14. A system for evaluating an earth formation, the system comprising:
   (a) a formation evaluation (FE) sensor on a bottom-hole assembly (BHA) configured to be conveyed into a borehole in the formation, the FE sensor configured to acquire data indicative of a property of the earth formation;
   (b) a processor configured to define a set of parameters characterizing an image of the data,
   (c) a processor configured to alter at least a subset of the parameters during the acquiring of the data; and
   (d) a downhole processor configured to:
      (A) process the data to produce a bitstream representative of the image using the defined parameters; and
      (B) transmit the bitstream to a surface location.

15. The system of claim 14 wherein the FE sensor is configured to acquire the data during continued rotation of the BHA.

16. The system of claim 14 wherein the FE sensor is selected from the group consisting of (i) a resistivity sensor, (ii) a density sensor, (iii) a porosity sensor, (iv) a micro-resistivity imaging sensor, (v) a borehole televiewer, (vi) a gamma ray sensor, and (vii) a caliper.

17. The system of claim 14 wherein the set of parameters comprises at least one of (i) the number of rows and columns of the image; (ii) a time resolution $T_r$, (iii) a number of bits per pixel, (iv) a number of telemetry words per time frame for one image block, (v) a scaling method to be used, and (vi) a method of data block creation.

18. The system of claim 14 wherein the processor in (d) is configured to alter the subset of the parameters based on at least one of: (i) a time interval, (ii) at specified depth intervals, (iii) a predefined depth, (iv) an output of the FE sensor, and (v) a determined dip.

19. The system of claim 14 wherein the downhole processor is configured to process the data by performing at least one of (i) interpolation, and (ii) smoothing.

20. The system of claim 14 wherein the downhole processor is configured to process the data using one of (i) an arithmetic averaging, (ii) a harmonic averaging, and (iii) a geometric averaging.

21. The system of claim 14 wherein the processor is configured to process the data by further creating an image block.

22. The system of claim 21 wherein the processor is configured to process the data by further applying a transformation to an image block, the transformation selected from (i) a discrete cosine transform, and (ii) a wavelet transform.

23. The system of claim 21 wherein processor is configured to process the data by further encoding an image block using an encoder selected from (i) a Huffman encoder, (ii) a runlength encoder, (iii) an arithmetic encoder, (iv) a zero tree encoder, and (v) a set partitioning in hierarchical trees.

24. The system of claim 14 further comprising a surface processor configured to decompress the transmitted bitstream, the decompressing including at least one of (i) decoding, (ii) an inverse transform, (iii) a rescaling, and (iv) storing into a database.

25. The system of claim 24 wherein the processor is further configured to determine a dip angle.

26. The system of claim 25 wherein the downhole processor is further configured to control a direction of drilling of the BHA based at least in part on the dip determination.

27. A computer readable medium for use with an apparatus for evaluating an earth formation, the apparatus comprising:
(a) a formation evaluation (FE) sensor on a bottom-hole assembly (BHA) configured to be conveyed into a borehole in the formation, the FE sensor configured to acquire data indicative of a property of the earth formation;
the medium comprising instructions which enable a downhole processor to:
(b) process the data to produce a bitstream representative of an image using defined parameters that are altered during the acquiring of the data; and
(c) transmit the bitstream to a surface location.

28. The computer readable medium of claim 27 further comprising at least one of (i) a ROM, (ii) an EPROM, (iii) an EAROM, (iv) a Flash Memory and (v) an optical disk.

* * * * *

UNITED STATES PATENT AND TRADEMARK OFFICE
CERTIFICATE OF CORRECTION

PATENT NO. : 7,272,504 B2 Page 1 of 1
APPLICATION NO. : 11/273983
DATED : September 18, 2007
INVENTOR(S) : Oleg Akimov et al.

It is certified that error appears in the above-identified patent and that said Letters Patent is hereby corrected as shown below:

Col. 11, line 8, change "according gets" to --according 315 gets--;

Col. 11, line 25, add a period --.-- after the word "information"

Signed and Sealed this

Eleventh Day of March, 2008

JON W. DUDAS
*Director of the United States Patent and Trademark Office*